US012482806B2

(12) United States Patent
Ohata et al.

(10) Patent No.: US 12,482,806 B2
(45) Date of Patent: Nov. 25, 2025

(54) HYDROGEN ABSORBING ALLOY NEGATIVE ELECTRODE AND NICKEL-HYDROGEN SECONDARY BATTERY INCLUDING THE HYDROGEN ABSORBING ALLOY NEGATIVE ELECTRODE

(71) Applicant: FDK CORPORATION, Tokyo (JP)

(72) Inventors: Shota Ohata, Tokyo (JP); Akira Saguchi, Tokyo (JP); Jun Ishida, Tokyo (JP); Yuki Ehara, Tokyo (JP); Masaru Kihara, Tokyo (JP)

(73) Assignee: FDK CORPORATIN, Tokyo (JP)

( * ) Notice: Subject to any disclaimer, the term of this patent is extended or adjusted under 35 U.S.C. 154(b) by 627 days.

(21) Appl. No.: 17/744,647

(22) Filed: May 14, 2022

(65) Prior Publication Data

US 2022/0384779 A1 Dec. 1, 2022

(30) Foreign Application Priority Data

May 28, 2021 (JP) .................. 2021-090606

(51) Int. Cl.
*H01M 4/00* (2006.01)
*H01M 4/24* (2006.01)
*H01M 4/32* (2006.01)
*H01M 4/46* (2006.01)
*H01M 4/52* (2010.01)
(Continued)

(52) U.S. Cl.
CPC ............. *H01M 4/242* (2013.01); *H01M 4/32* (2013.01); *H01M 4/466* (2013.01); *H01M 4/52* (2013.01); *H01M 10/26* (2013.01); *H01M 10/30* (2013.01); *H01M 2004/027* (2013.01); *H01M 2004/028* (2013.01); *H01M 2220/20* (2013.01); *H01M 2220/30* (2013.01); *H01M 2300/0014* (2013.01)

(58) Field of Classification Search
CPC ......... Y02E 60/124; H01M 4/62; H01M 4/24; H01M 4/32; H01M 10/30; H01M 10/26; H01M 4/52
See application file for complete search history.

(56) References Cited

U.S. PATENT DOCUMENTS

2014/0120411 A1* 5/2014 Kihara .................... H01M 4/62
429/163

FOREIGN PATENT DOCUMENTS

EP 2728654 B1 7/2015
JP H08329934 A 12/1996
(Continued)

OTHER PUBLICATIONS

Ishida et al., Nickel-hydrogen Secondary Battery Used For Portable Electronic Device, Comprises Electrode Group Comprising Positive Electrode And Negative Electrode Which Overlaid Through Separator And Container Which Has Accommodated Electrode Group, Aug. 2016, See the Abstract. (Year: 2016).*

(Continued)

*Primary Examiner* — Tiffany Legette
*Assistant Examiner* — Monique M Wills
(74) *Attorney, Agent, or Firm* — Kinney & Lange, P.A.

(57) ABSTRACT

A hydrogen absorbing alloy negative electrode is provided. The hydrogen absorbing alloy negative electrode has a hydrogen absorbing alloy, and an additive including yttrium fluoride. A mass of the yttrium fluoride is 0.1 parts by mass or more and 0.2 parts by mass or less based on a hydrogen absorbing alloy powder of 100 parts by mass.

2 Claims, 3 Drawing Sheets

(51) Int. Cl.
    *H01M 10/26*         (2006.01)
    *H01M 10/30*         (2006.01)
    *H01M 4/02*           (2006.01)

(56) References Cited

FOREIGN PATENT DOCUMENTS

| JP | H10134806 A | | 5/1998 | | |
|---|---|---|---|---|---|
| JP | H10233210 A | | 9/1998 | | |
| JP | 2016149299 A | * | 8/2016 | ........... | Y02E 60/124 |

OTHER PUBLICATIONS

Extended European Search Report dated Oct. 11, 2022, for corresponding European Application No. 22175737.0.

* cited by examiner

FIG. 2

TABLE 1 BATTERY CHARACTERISTICS

| | AMOUNT OF YTTRIUM FLUORIDE ADDED (% BY WEIGHT) | AMOUNT OF CALCIUM FLUORIDE ADDED (% BY WEIGHT) | LOW-TEMPERATURE CHARGING CHARACTERISTICS RATIO (%) | CYCLE CHARACTERISTICS |
|---|---|---|---|---|
| EXAMPLE 1 | 0.2 | – | 89.8 | 110 |
| EXAMPLE 2 | 0.2 | 0.5 | 92.2 | 122 |
| EXAMPLE 3 | 0.1 | 0.5 | 92.7 | 116 |
| COMPARATIVE EXAMPLE 1 | – | – | 88.5 | 100 |
| COMPARATIVE EXAMPLE 2 | – | 0.5 | 86.3 | 103 |
| COMPARATIVE EXAMPLE 3 | 0.3 | 0.5 | 85.4 | 128 |
| COMPARATIVE EXAMPLE 4 | 0.05 | 0.5 | – | 100 |

HYDROGEN ABSORBING ALLOY NEGATIVE ELECTRODE AND NICKEL-HYDROGEN SECONDARY BATTERY INCLUDING THE HYDROGEN ABSORBING ALLOY NEGATIVE ELECTRODE

CROSS-REFERENCE TO RELATED APPLICATION(S)

This application claims priority to Japanese Application No. 2021-090606 filed on May 28, 2021, which is incorporated by reference herein in its entirety.

BACKGROUND

Technical Field

The present disclosure relates to a hydrogen absorbing alloy negative electrode and a nickel-hydrogen secondary battery including the hydrogen absorbing alloy negative electrode.

Description of the Related Art

A nickel-hydrogen secondary battery has higher capacity and superior environmental safety compared with a nickel-cadmium secondary battery, and therefore is used for various equipment such as portable electronic devices, power tools and hybrid electric vehicles, and their applications are expanding. With the expansion of these applications, higher performance is desired for the nickel-hydrogen secondary battery. Japanese Patent Laid-Open No. 8-329934 discloses that it is an important challenge to improve cycle life characteristics. That is, it is required that the cycle life characteristics be improved in order to be able to increase the number of charging and discharging of the battery, and a number of studies have been performed.

Japanese Patent Laid-Open No. 2016-149299 proposes the use of, for example, a rare-earth fluoride as an additive to a negative electrode active material mixture in order to increase the cycle life. By using such a material, corrosion of the hydrogen absorbing alloy containing hydrogen, which is a negative electrode active material, by high concentration alkali as an electrolyte solution can be suppressed. Thus, the cycle life characteristics of the battery can be improved.

However, when the rare-earth fluoride of a certain concentration or more is added, a problem is that dischargeable capacity is deteriorated in case of charging in a low temperature environment of e.g., −10° C. of sub-zero temperature. That is, low-temperature charging characteristics are degraded. In this disclosure, normal charging characteristics indicate the maximum chargeable capacity when charging at room temperature (25° C.). On the other hand, "low-temperature charging characteristics" means the maximum capacity that is capable to discharge in a room temperature environment after charging at a temperature lower than the room temperature such as e.g., −10° C., sub-zero temperature.

Therefore, an objective of the present disclosure is to provide a hydrogen absorbing alloy negative electrode balancing the cycle life characteristics and the low-temperature charging characteristics, and a nickel-hydrogen secondary battery including the hydrogen absorbing alloy negative electrode.

SUMMARY

The present disclosure features a hydrogen absorbing alloy negative electrode having a hydrogen absorbing alloy; and an additive including yttrium fluoride. A mass of the yttrium fluoride is 0.1 parts by mass or more and 0.2 parts by mass or less based on a hydrogen absorbing alloy powder of 100 parts by mass.

BRIEF DESCRIPTION OF THE DRAWINGS

FIG. 2 is a table showing low-temperature charging characteristics and cycle life characteristics.

DETAILED DESCRIPTION

1. Structure and Production of Nickel-Hydrogen Secondary Battery

A nickel-hydrogen secondary battery (hereinafter referred to as a battery) 2 according to the present disclosure will be described with reference to drawings.

Figure 1:
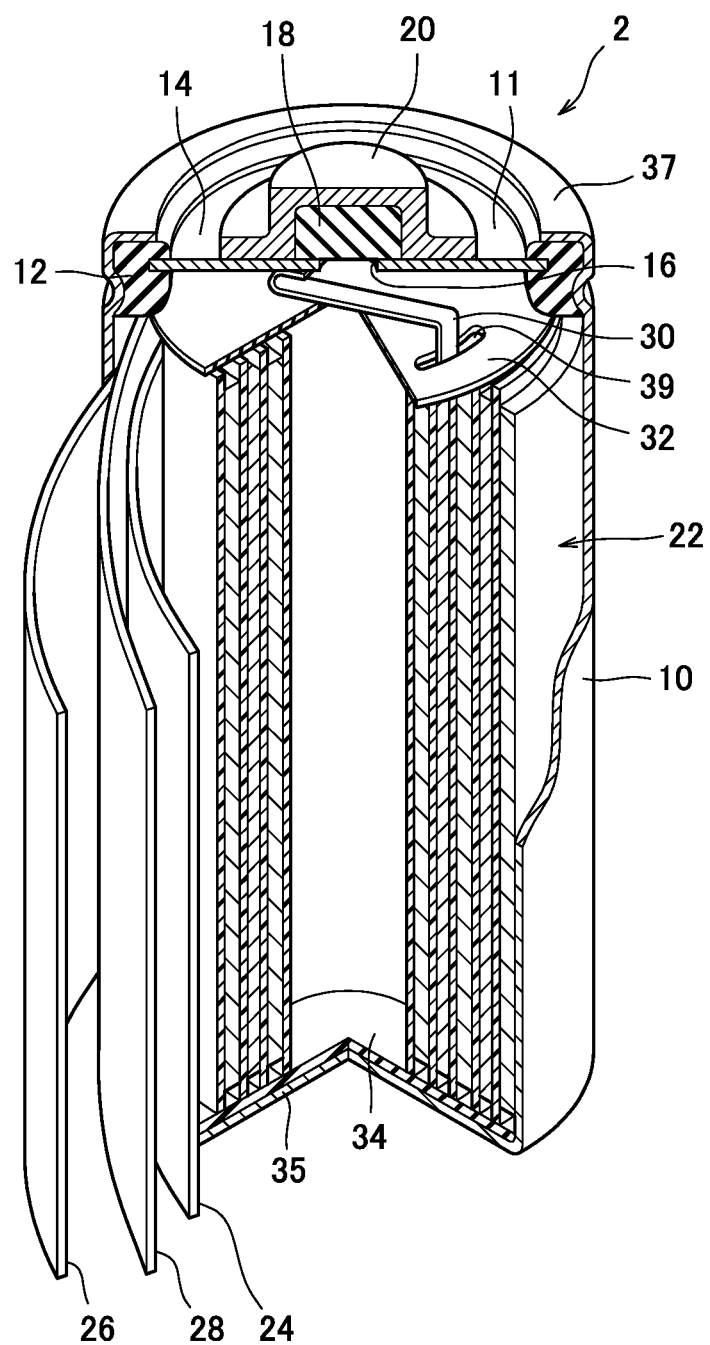
FIG. 1 is s partially broken perspective view of a nickel-hydrogen secondary battery according to an embodiment.

FIG. 1 shows a cylindrical battery 2 of AA size; however, the size of the battery 2 to which the present disclosure is applied is not limited to the AA size.

As shown in FIG. 1, the battery 2 includes an outer can 10 which has a cylindrical shape with a sealed bottom and an open upper end. A bottom wall 35 of the outer can 10 has conductivity, and functions as a negative electrode terminal. A sealing member 11 is fixed to an opening of the outer can 10. The sealing member 11 includes a cover plate 14 and a positive electrode terminal 20, and seals the outer can 10. In the opening of the outer can 10, a disk-shaped cover plate 14 having conductivity and a ring-shaped insulation gasket 12 surrounding the cover plate 14 are arranged. The insulation gasket 12 is fixed to an opening edge of the outer can 10 by swaging the opening edge 37 of the outer can 10. That is, the cover plate 14 and the insulation gasket 12 work together to airtightly close the opening of the outer can 10.

The cover plate 14 has a gas vent hole 16 in the center, and a valve member 18 made of rubber is arranged on the outer surface of the cover plate 14 to close up the gas vent hole 16. Further, on the outer surface of the cover plate 14, the cylindrical-shaped positive electrode terminal 20 with a flange is fixed to cover the valve member 18. The positive electrode terminal 20 presses the valve member 18 toward the cover plate 14. In addition, the positive electrode terminal 20 is provided with a vent hole (not shown). The gas vent hole 16 is normally airtightly sealed by the valve member 18. However, when gas is generated inside the outer can 10 to increase an internal pressure, the valve member 18 is compressed by the internal pressure to open the gas vent hole 16. This allows the gas to be discharged through the gas vent hole 16 and the vent hole of the positive electrode terminal 20 from the outer can 10. That is, the gas vent hole 16, the valve member 18, and the positive electrode terminal 20 form a safety valve for the battery.

In the outer can 10, an electrode group 22 is housed. The electrode group 22 includes a positive electrode 24, a negative electrode 26, and a separator 28, each having a band-shape. The separator 28 is interposed between the positive electrode 24 and the negative electrode 26, and spirally wound. That is, the positive electrode 24 and the negative electrode 26 face each other with the separator 28 interposed therebetween, and are overlapped in a radial direction of the outer can 10.

In the inside of the outer can 10, the positive electrode lead 30 is disposed between one end of the electrode group 22 and the cover plate 14, and each end portion of the positive electrode lead 30 is connected to the positive electrode 24 and the cover plate 14, respectively. That is, the positive electrode terminal 20 on the cover plate 14 and the positive electrode 24 are electrically connected to each other through the positive electrode lead 30 and the cover plate 14. Here, the circular insulating member 32 is disposed between the cover plate 14 and the electrode group 22, and the positive electrode lead 30 extends through a slit 39 provided in the insulating member 32. A circular insulating member 34 is also disposed between the electrode group 22 and a bottom portion of the outer can 10.

In the inside of the outer can 10, a predetermined amount of an alkaline electrolyte solution (not shown) is injected. The alkaline electrolyte solution is impregnated in the positive electrode 24, the negative electrode 26 and the separator 28, and involved in charging and discharging reactions between the positive electrode 24 and the negative electrode 26. The alkaline electrolyte solution is not limited, and an alkaline electrolyte solution containing NaOH as a main constituent of a solute is used. It is preferable that the alkaline electrolyte solution in the present embodiments contains as the solute at least one of KOH and LiOH in addition to NaOH. For example, an electrolyte solution composed of 8.0:0.7 of NaOH solution and LiOH solution is used. In this manner, the electrolyte solution having a high Na content is preferably used, thereby increasing overvoltage required for a hydrolysis reaction, more enhancing the charging efficiency.

In the electrode group 22, the separator 28 is not wound on outer circumference, and an outermost circumferential portion of the negative electrode 26 forms the outer circumference of the electrode group 22. This outer circumferential surface is in contact with a circumferential wall of the outer can to electrically connect the negative electrode 26 with the outer can 10 each other.

As the separator 28, it is preferable that, for example, nonwoven fabric composed of polypropylene fibers subjected to sulfonation treatment is used. Here, a sulfonic acid group captures metal ions eluted in the electrolyte solution, and prevents the eluted metal ion from depositing on each surface of a positive electrode active material and a negative electrode active material. This sulfonation treatment of the separator 28 not only imparts hydrophilic properties, but also prevents the eluted metal ions from depositing on the active material surface which is a factor in lowering charging temperature characteristics and the cycle life characteristics, thus contributing to suppression of self-discharge of the battery 2.

The positive electrode 24 is composed of a conductive positive electrode substrate having a porous structure and a positive electrode mixture retained in pores of the positive electrode substrate and surfaces of the positive electrode substrate. As the positive electrode substrate, used can be, for example, reticulated, sponge-like, or fibrous metal bodies, which are subjected to nickel plating, and foamed nickel.

The positive electrode mixture includes positive electrode active material particles, a conductive material, a positive electrode additive, and a binder. The positive electrode active material particles are nickel hydroxide particles or higher order nickel hydroxide particles. Further, it is preferable that these nickel hydroxide particles make solid solution with at least one selected from the group consisting of zinc, magnesium, and cobalt.

The positive electrode additive is appropriately selected as needed and added in order to improve characteristics of the positive electrode. The main positive electrode additive includes e.g., yttrium oxide and zinc oxide.

As the conductive material, one or more selected from a cobalt compound such as cobalt oxide (CoO) and cobalt hydroxide (Co(OH)$_2$), and cobalt (Co) can be used. This conductive material is added to the positive electrode mixture as needed, and may be included, as a form to be added, in the positive electrode mixture in a coating form which covers surfaces of the positive electrode active material, in addition to a powder form.

The binder binds the positive electrode active material particles, the conductive material and the positive electrode additive, and also binds the positive electrode mixture to the positive electrode substrate. Here, as the binder, carboxymethyl cellulose, methyl cellulose, polytetrafluoroethylene (PTFE) dispersion, hydroxypropyl cellulose (HPC) dispersion, etc., can be used.

These positive electrode active material particles, the conductive material, the positive electrode additive, the binder, and water are mixed to prepare positive electrode active material slurry.

For example, in order to obtain a composition of 3% by weight of zinc, 0.4% by weight of magnesium, and 1% by weight of cobalt, with respect to metal nickel, while stirring a mixed solution of nickel sulfate, zinc sulfate, magnesium sulfate, and cobalt sulfate, a sodium hydroxide solution is gradually added to stabilize to 13 to 14 of pH during a reaction, to elute nickel hydroxide. This is washed three times with 10 times the amount of pure water, and then undergoes dewatering and drying processes to produce a nickel hydroxide active material.

Next, to this nickel hydroxide active material, 10% by weight of cobalt hydroxide, 0.5% by weight of yttrium oxide, 40% by weight of hydroxypropyl cellulose (HPC) dispersion solution, and 0.3% by weight of zinc oxide are mixed to produce the positive electrode active material slurry. This positive electrode active material slurry is filled in the positive electrode substrate, and the positive electrode substrate is rolled after drying, and cut into a predetermined size, to produce a nickel positive electrode plate.

The negative electrode 26 has a belt-shaped conductive negative electrode core member, and a negative electrode mixture is coated on the negative electrode core member. The negative electrode core member is composed of a metal sheet in which through holes are distributed. Used is, e.g., a punching sheet made of iron subjected to nickel plating on a surface. The negative electrode mixture is held on the negative electrode core member to form a negative electrode mixture layer.

The negative electrode mixture includes hydrogen absorbing alloy particles, a negative electrode additive, a conductive material, and a binder.

The hydrogen absorbing alloy is an alloy capable to absorb and discharge hydrogen which is a negative electrode active material. As the hydrogen absorbing alloy, a general hydrogen absorbing alloy can be used. In the present disclosure, as the hydrogen absorbing alloy, a rare earth-Mg—Ni hydrogen absorbing alloy containing a rare earth element, Mg, and Ni can be used.

Particles of the hydrogen absorbing alloy are obtained e.g., as follows.

La, Mg, Ni, and Al are weighed and mixed to a predetermined composition, and the mixture is melted in an argon gas atmosphere by a high frequency induction furnace, casted in a mold, and cooled to room temperature, to obtain an alloy ingot. The alloy ingot is put in a metal container, and the inside of the container is sealed after being replaced with argon gas. After that, the container is put in a heat treatment furnace and subjected to heat treatment at a temperature of 900° C. or more and 1,000° C. or less for 10 hours. After cooling, the alloy ingot is pulverized and sieved, to obtain the hydrogen absorbing alloy particles having a desired particle size.

Here, as the particles of the hydrogen absorbing alloy, its particle size is not limited. The particle of the hydrogen absorbing alloy having a mean volume particle diameter (MV) of 65.0 μm is preferably used. Further, in the present disclosure, the mean volume particle diameter (MV) means a mean volume particle diameter obtained by a laser diffraction scattering method using a particle diameter distribution measuring apparatus.

As the negative electrode additive, powder of fluoride of a rare earth element (Sc, Y, La, Ce, Pr, Nd, Pm, Sm, Eu, Gd, Tb, Dy, Ho, Er, Tm, Yb and Lu) can be used. In the present embodiments, yttrium fluoride (YF3) can be used as the fluoride of the rare earth element. It is more preferable that an amount of the yttrium fluoride is 0.1% by weight or more and 0.2% by weight or less based on the weight of the hydrogen absorbing alloy powder of 100%. Calcium fluoride may be further added as the negative electrode additive.

The binder binds the hydrogen absorbing alloy particles, the negative electrode additive, and the conductive material to each other, and also binds the negative electrode mixture to the negative electrode core member. As the binder, a hydrophilic or hydrophobic polymer, etc., can be used. Further, as the conductive material, carbon black, graphite, nickel powder, etc., can be used.

Based on the weight of the hydrogen absorbing alloy powder obtained of 100%, 0.4% by weight of sodium polyacrylate, 0.1% by weight of carboxymethyl cellulose (CMC), 1.0% by weight of styrene-butadiene rubber (SBR) dispersion of a 50% solid content, 0.5% by weight of Ketjen black, 0.5% by weight of calcium fluoride, 30% by weight of ion exchanged water, and a predetermined amount of yttrium fluoride are added and mixed to prepare paste of the negative electrode mixture. This paste is uniformly coated on both surfaces of the negative electrode core member. After drying the paste, the negative electrode core member on which the hydrogen absorbing alloy powder is coated is rolled to increase an alloy amount per volume. Then, the negative electrode core member is cut into a predetermined size to produce the hydrogen absorbing alloy negative electrode. The negative electrode mixture is not only filled in the through holes of the negative electrode core member, but also held in layers on each of both surfaces of the negative electrode core member.

The positive electrode 24 and the negative electrode 26 produced by the processes described above are housed in the outer can 10 by laminating each other with the separator interposed therebetween and spirally winding. Then, a predetermined amount of electrolyte solution of which a weight ratio of NaOH solution to LiOH solution is composed of 8.0:0.7 is poured into the outer can 10, and the opening of the outer can 10 is sealed. In this way, the battery 2 having a rated capacity of 2,000 mAh is produced.

An initial activation process is performed by repeating five times of a charging and discharging operation, in which the battery 2 produced is charged at 0.20 A for 16 hours and then discharged at 0.4 A until the battery voltage is decreased to 1.0 V. In this way, the battery 2 is made capable to use.

2. Examples

To examine cycle characteristics and low-temperature charging characteristics of the battery constituted above, produced is the battery 2 in which an amount (% by weight) of yttrium fluoride and an amount (% by weight) of calcium fluoride as negative electrode additives are changed based on the weight of a hydrogen absorbing alloy powder of 100% by weight. Further, except for an amount of the yttrium fluoride added and an amount of the calcium fluoride added as the negative electrode additives, producing conditions of the battery 2 are the same to each other.

Example 1

A battery containing 0.2% by weight of the yttrium fluoride as the negative electrode additive, but not containing the calcium fluoride is produced.

Example 2

A battery containing 0.2% by weight of the yttrium fluoride and 0.5% by weight of the calcium fluoride as the negative electrode additives is produced.

Example 3

A battery containing 0.1% by weight of the yttrium fluoride and 0.5% by weight of the calcium fluoride as the negative electrode additives is produced.

Comparative Example 1

A battery containing none of the yttrium fluoride and the calcium fluoride as the negative electrode additive is produced.

Comparative Example 2

A battery containing no yttrium fluoride but containing 0.5% by weight of the calcium fluoride as the negative electrode additive is produced.

Comparative Example 3

A battery containing 0.3% by weight of the yttrium fluoride and 0.5% by weight of the calcium fluoride as the negative electrode additives is produced.

Comparative Example 4

A battery containing 0.05% by weight of the yttrium fluoride and 0.5% by weight of the calcium fluoride as the negative electrode additives is produced.

3. Evaluation of Nickel-Hydrogen Secondary Battery

Low-Temperature Charging Characteristics

To each battery of Examples 1 to 3 and Comparative Examples 1 to 4 that have undergone initial activation treatment, (a) the charging is performed with 2.0 A in an environment of 25° C. Here, the charging to the battery is performed by means of so-called −ΔV control (hereinafter referred to as "−ΔV charging" simply). Under the −ΔV charging, the charge to the battery is finished when a battery voltage reaches the maximum value and then drops 10 mV from the maximum value. After this −ΔV charging was finished, (b) the battery is left to stand for one hour, and discharging is performed with 2.0 A until the battery voltage is decreased to 1.0 V. A discharge capacity of the battery 2 at this time is measured as an initial capacity [A] mAh. After that, (c) the battery 2 is left to stand at the environment of 25° C. for one hour. A series of processes (a) to (c) is defined as one cycle for charging and discharging. Three (3) cycles are performed.

Next, after the battery 2 is left to stand in an environment of 0° C. for three (3) hours, the battery 2 is performed to be fully charged with 2.0 A in the environment of 0° C. and the −ΔV charging is then performed. After the −ΔV charging in the environment of 0° C., the battery 2 is again left to stand in the environment of 25° C. for three (3) hours, and the battery 2 is discharged with 2.0 A until the battery voltage is decreased to 1.0 V. A discharge capacity of the battery 2 at this time was measured as a capacity [B] mAh. From the capacities obtained by the above procedure, a charging characteristics ratio was calculated from the following Expression (I).

Low-temperature charging characteristics ratio
(%)=B/A=(capacity B)/(initial capacity A)    (I)

Therefore, when the battery 2 is charged in the environment of 0° C., the higher the low-temperature charging characteristics ratio is, the less the influence of reducing of the charging capacity due to the low temperature (0° C.) is. FIG. 2 shows the low-temperature charging characteristics of Examples 1 to 3 and Comparative Examples 1 to 3.

The low-temperature charging characteristics ratios are 89.8% in Example 1, 92.2% in Example 2, and 92.7% in Example 3. On the other hand, the low-temperature charging characteristics ratios are 88.5% in Comparative Example 1, 86.3% in Comparative Example 2, and 85.4% in Comparative Example 3.

Comparing the above charging characteristics, it is found that in the batteries of Examples 1 to 3 containing 0.1% by weight to 0.2% by weight of the yttrium fluoride, the discharging capacity after the low-temperature charging is larger than those of the batteries of Comparative Examples 1 to 3. That is, this means that the capacity charged in the battery in the low-temperature environment such as e.g., the environment of 0° C., is larger. Further, it is found that when the amount of the yttrium fluoride is 0.05% by weight which is less than 0.1% by weight, the low-temperature charging characteristics are deteriorated. On the other hand, even when the amount of the yttrium fluoride is 0.3% by weight, which is more than 0.2% by weight, the low-temperature charging characteristics are deteriorated. Therefore, the low-temperature charging characteristics of the battery containing 0.1% by weight to 0.2% by weight as the amount of the yttrium fluoride are improved.

(2) Cycle Life Characteristics

Each battery of Examples 1 to 3 and Comparative Examples 1 to 4 is charged with 1.0 C in the environment of 25° C., and the charging is finished when the battery voltage is decreased 10 mV from the maximum value. The battery is then left to stand for one hour. After that, the battery is discharged with 1.0 C in the same environment until the battery voltage is decreased to 1.0 V, and left to stand for one hour. Regarding the above charging and discharging cycle as 1 cycle, the charging and discharging are repeated to measure a discharging capacity for each cycle. Here, regarding the discharging capacity of the first cycle as an initial capacity, a capacity initial ratio of each cycle was calculated from the following Expression (II).

Capacity Initial Ratio (%)=(Discharging Capacity of Each Cycle/Initial Capacity)×100    (II)

For each battery of Examples and Comparative Examples, the charging and discharging was repeated, to count a number of cycles until the capacity initial ratio reached 60%. With respect to the counted numbers of cycles, the battery of Comparative Example 1, in which none of the yttrium fluoride and the calcium fluoride was added, was regarded as a reference standard. The number of cycles of this reference standard was regarded as 100, ratios of numbers of cycles of the batteries of Examples 1 to 3 and Comparative Examples 2 to 4 were obtained. The more the number of cycles until this capacity initial ratio reaches 60% was, the longer the cycle life of the battery was. These ratios are shown in TABLE 1 of FIG. 2.

The cycle life characteristics were 100 in Example 1, 122 in Example 2, and 116 in Example 3. On the other hand, the cycle life characteristics were 103 in Comparative Example 2, 128 in Comparative Example 3, and 100 in Comparative Example 4.

From the above, as seen from Examples 1, 2, 3 and Comparative Example 3, it is found that the cycle life of the battery was prolonged by containing 0.1% by weight or more of the yttrium fluoride, compared with the battery containing less than 0.1% by weight of the yttrium fluoride of Comparative Example 1 or 4.

Further, comparing Examples 1, 2 and 3 containing 0.1% by weight or more of the yttrium fluoride, it is found that the battery of Example 2 or 3 containing calcium fluoride as an additive had a longer cycle life than that of the battery of Example 1 not containing the calcium fluoride. This tendency was observed between the battery of Comparative Example 1 containing none of the yttrium fluoride and the calcium fluoride, and the battery of Comparative Example 2 not containing the yttrium fluoride but containing the calcium fluoride. In this manner, it is found that the battery in which the calcium fluoride is added obtains a longer cycle life.

4. Consideration

From the results of TABLE 1, it is found that the low-temperature charging characteristics at 0° C., etc. of the battery in which 0.1 to 0.2% by weight of the yttrium fluoride is added are improved, compared with the battery in which the yttrium fluoride is not added. Specifically, in the battery in which 0.1 to 0.2% by weight of the yttrium fluoride is added, even in the low-temperature environment, it is possible to charge the battery to a capacity close to the charging capacity in the room temperature environment. This is because factors inhibiting the battery 2 from charging in the low-temperature environment are reduced by adding 0.1 to 0.2% by weight of the yttrium fluoride to the negative electrode mixture, and corrosion inhibiting effect of the hydrogen absorbing alloy due to the yttrium fluoride can be more exhibited.

When the amount of the yttrium fluoride added is more than 0.2% by weight, the cycle life is prolonged, but the low-temperature characteristics are deteriorated. Further, when the amount of the yttrium fluoride added is less than 0.1% by weight, it is considered that its absolute amount of the yttrium fluoride added is insufficient to improve the low-temperature charging characteristics.

Also, regarding the cycle life, by comparing Example 1 with Example 2 or Comparative Example 1 with Comparative Example 2, it is found that the cycle life of the battery in which the calcium fluoride was added is prolonged compared with the battery in which no calcium fluoride was added.

Figure 3:
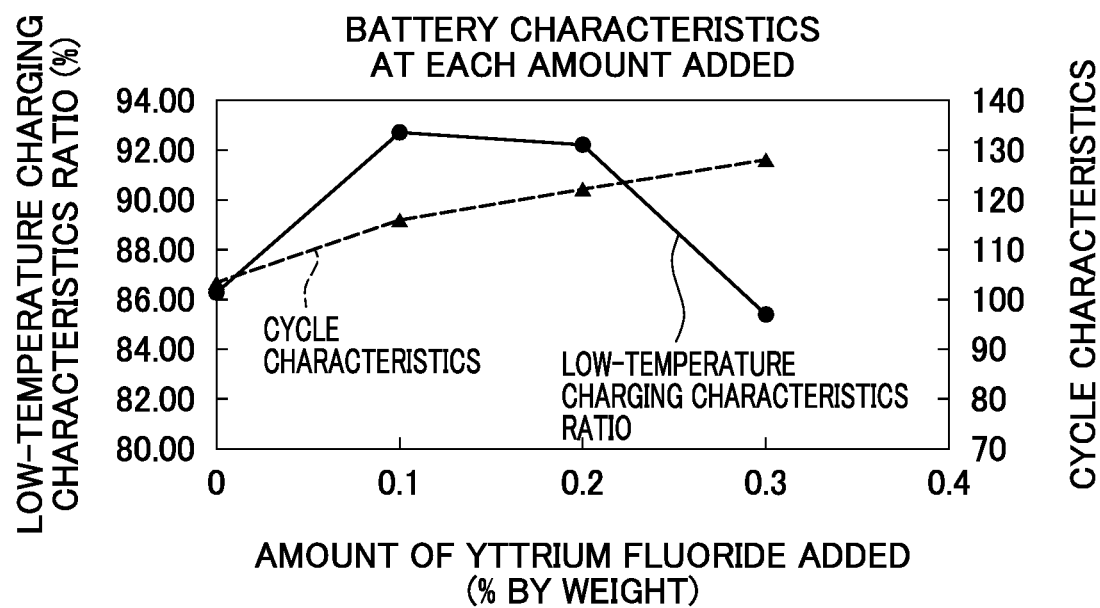
FIG. 3 is a graph showing changes of the low-temperature charging characteristics and the cycle life characteristics related to an amount of yttrium fluoride added.

FIG. 3 indicates based on the results seen in TABLE 1 a graph of the low-temperature charging characteristics and the cycle life characteristics with respect to the amount of the yttrium fluoride added are shown in FIG. 3. It is found that when the amount of the yttrium fluoride added was increased with respect to the hydrogen absorbing alloy powder, the cycle life was prolonged with its increase. On the other hand, the low-temperature charging characteristics peaked between 0.1% by weight and 0.2% by weight of the yttrium fluoride, and deteriorated when the amount of the yttrium fluoride added is increased.

From the above, by adding 0.1% by weight or more and 0.2% by weight or less of the yttrium fluoride, and adding 0.5% by weight of the calcium fluoride to the hydrogen absorbing alloy powder, prolongation of the cycle life and improvement of the low-temperature charging characteristics of the nickel-hydrogen secondary battery can be balanced.

According to the hydrogen absorbing alloy negative electrode of the present disclosure, in the nickel-hydrogen secondary battery including the hydrogen absorbing alloy negative electrode, the low-temperature charging characteristics in addition to the charging and discharging cycle life can be improved.

Furthermore, the present disclosure is not limited to the above embodiments and examples, various variations are possible. For example, in addition to the yttrium fluoride and the calcium fluoride, fluoride of other rare earth elements can be added as the negative electrode additives. Further, a shape of the nickel-hydrogen secondary battery may be a square shape, and the shape of the battery is not particularly limited.

What is claimed is:

1. A hydrogen absorbing alloy negative electrode comprising:
    a hydrogen absorbing alloy; and
    an additive including yttrium fluoride,
    wherein a mass of the yttrium fluoride is 0.1 parts by mass or more and 0.2 parts by mass or less based on a hydrogen absorbing alloy powder of 100 parts by mass; and wherein the additive further includes calcium fluoride, and a mass of the calcium fluoride is up to 0.5 parts by mass based on the hydrogen absorbing alloy powder of 100 parts by mass.

2. A nickel-hydrogen secondary battery comprising:
    the hydrogen absorbing alloy negative electrode according to claim 1; and
    a positive electrode comprising nickel hydroxide and facing the hydrogen absorbing alloy negative electrode with a separator interposed therebetween,
    wherein the hydrogen absorbing alloy negative electrode and the positive electrode are housed in an outer can together with an electrolyte solution.

* * * * *